United States Patent

Ruiz

[11] 4,264,294
[45] Apr. 28, 1981

[54] PROFILING DIE

[76] Inventor: Oscar F. Ruiz, 15840 SW. 79 Ct., Miami, Fla. 33157

[21] Appl. No.: 1,881

[22] Filed: Jan. 8, 1979

[51] Int. Cl.³ ............................................. B29F 3/04
[52] U.S. Cl. .................................. 425/466; 425/392; 425/467; 425/DIG. 55
[58] Field of Search ..................... 425/466, 467, 392

[56] References Cited

U.S. PATENT DOCUMENTS

| | | | |
|---|---|---|---|
| 2,403,476 | 7/1946 | Berry et al. | 264/169 |
| 2,446,620 | 8/1948 | Swallow et al. | 425/392 |
| 3,966,387 | 6/1976 | Babbin et al. | 425/392 |
| 4,124,351 | 11/1978 | Garbuio | 425/466 |

Primary Examiner—John C. Bleutge
Assistant Examiner—A. H. Koecker

[57] ABSTRACT

A profiling die for use in processing tubular material where finish is a priority, such as for use in a catheter, the die being composed of a body of heat conductive material having a through passageway composed of a first bore extending from one face and a second coaxial bore extending from an opposite face, the second bore being larger than the first bore and there being an intermediate section between the bores which is tapered from the diameter of the second bore to the diameter of the first bore and wherein the tapered intermediate section and the first bore are aligned by an integral annular insert of Teflon material and preferably a keeper is provided to maintain the insert within the die.

5 Claims, 2 Drawing Figures

PROFILING DIE

FIELD OF INVENTION

This invention relates to a profiling die which is useful to finish or size a profile extruded tubular plastic material, such as a tubular length for use in a catheter.

BACKGROUND OF THE INVENTION

This invention is of a mold or die for use in finishing tubular material of plastic and, by way of particular example, tube lengths for use as angiographic catheters. It will be appreciated that it is important that such tubular lengths have resistance to torsion so that the distal end responds as closely as possible to rotation at the proximal end. Further, it is important to have a catheter which is capable of delivering a relatively large volume, that is, one which has as thin a wall as possible so as to present a lumen of maximum diameter which is strong and smooth on the interior and yet which has the other qualities herein discussed. It is further important that such a tubular length do not promote clotting within the time of a normal medical procedure. As is appreciated, in use catheters are inserted axially into a tubular shaped zone of the body and a catheter should, therefore, be sufficiently stiff so as not to buckle under axial pressure and also be characterized by what is often termed as lubriscity. Additionally, the catheter when deformed should have a memory capacity so as to return to the correct shape after being straightened by a guide wire during positioning of the catheter. Also, a low coefficient of friction between the inside of the catheter and the guide wire as well as between the outside surface of the catheter at the entrance site and the body, termed lubriscity, is important. Generally speaking in making tube lengths for angiographic catheters, as well as other type tube lengths, it is desirable to have a smoothly finished accurately made product.

This invention is of a mold or die for use in making a catheter with such characteristics including a high tensil flexible plastic such as one of a material from the nylon family which may be covered by another biocompatible like urethanes properly treated to decrease the high coefficient of friction. The present invention provides a die or mold whereby a substantially larger lumen for a tube length may be produced without sacrificing the other characteristics set forth above. It will be understood by those in the art that this tool is useful in extruding such materials as are used in the art for such catheters which may have a radial opaque ingredient.

SUMMARY OF THE INVENTION

Generally speaking, this invention is of a die for making catheters, or tubular lengths for catheters, having improved surface finish characteristics, i.e., lubriscity, and wherein the size thereof can be controlled in a manufacturing process of extruding thermoplastic round shapes. The invention is of a die preferably made of brass which in use is heated to an appropriate temperature below the melting point of the plastic being treated and above the deformation temperature and wherein there is a through passageway with a stepped cylindrical cavity with an intermediate conical section in which a piece of Teflon material of predetermined form and which is of integral molded form is disposed. The die preferably includes a plug so that it can be used directly in front of the extruder. The instant invention while described in one embodiment can be used for forming different profiles for catheter tubes which will give a better surface than grinding and using solvents and other coatings and also has the added advantage of being more economical and more manipulative in use.

The invention is for use in a process of forming inside and outside profiles for catheter lengths and includes the forming die with an interior cavity with the outside profile desired covered by a preformed Teflon shrink tubing with the required heat and tip desired and a stainless steel portion. The procedure is to insert a mandrel into the cavity as is well known in the art so that plastic may be passed through the die and the mandrel may be withdrawn from the other side of the die. It will be seen that upon axial movement into the larger bore, the leading end of the tubular length of sllightly less diameter will be guided by the Teflon lined tapered or conical surface to the diameter of the Teflon lined smaller bore size, i.e., the outside diameter of the tube being formed will be intercepted by the annular face of the conical Teflon portion presented to it and, in the process described of using the die, after passage through the heated zone of the die, which includes the Teflon lined zone, including the cylindrical length to which it is constrained and constricted, the outside diameter of the tube will be somewhat smaller after passage from one end of the forming die to the other end.

OBJECTS OF THE INVENTION

It is, accordingly, an object of this invention to provide an improved tool for use in making tubular lengths of plastic material.

In accordance with this principal object, and other principal objects, the instant invention will now be described with reference to the accompanying drawings, in which:

DESCRIPTION OF THE PREFERRED EMBODIMENT

Figure 1:
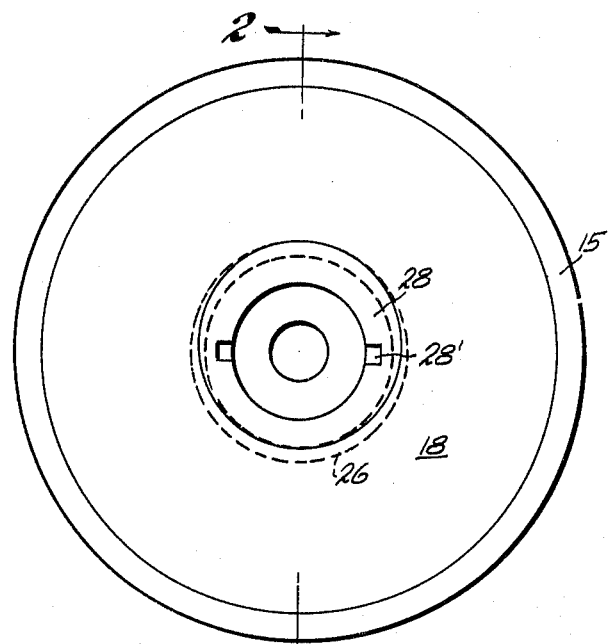
FIG. 1 is the end view of a mold constructed in accordance with the instant invention.
Figure 2:
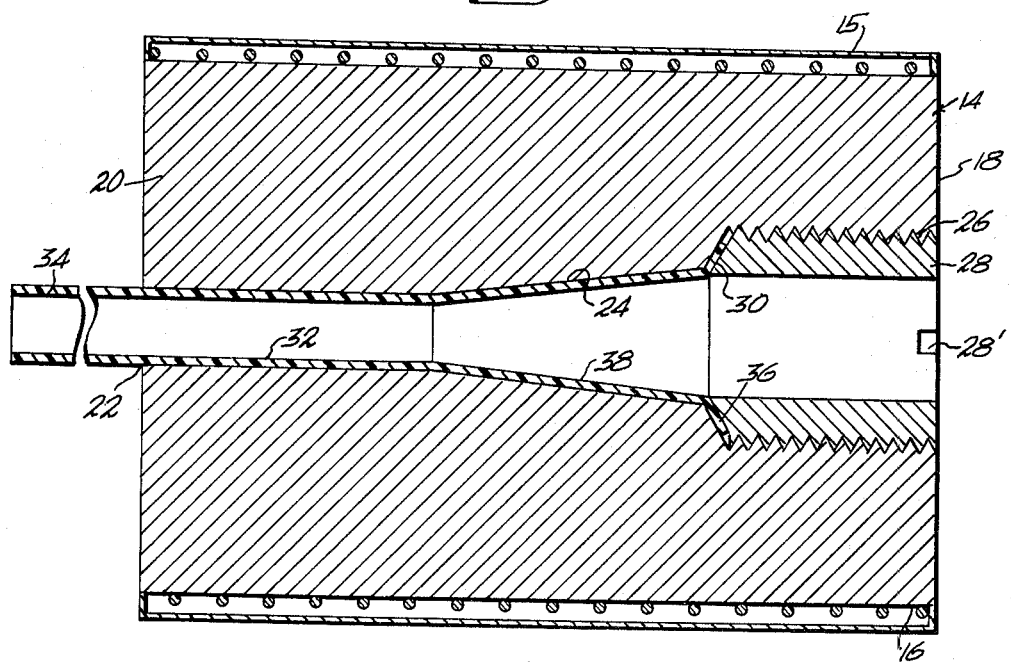
FIG. 2 is a view in cross section taken on the plane indicated by the line 2—2 of FIG. 1 and looking in the direction of the arrows.

Referring to the drawings wherein like reference characters designate like or corresponding parts throughout the several views, and referring particularly to FIG. 2, there is shown a mold 14 having a body 20 with an end face 18 and an opposite end face and an axially extending annular surface 16 which is jacketed by a conventional heater means 15, such as an electrical resistance coil. In the mold body there is a first axial bore 22 of predetermined size extending from one end face and from the other end face 18 a second coaxial threaded bore of a larger diameter than that of the first mentioned bore. Between the inner end of these two bores there is a coaxial tapered section 24. Preferably, within the bore 26 in the end face 18, a threaded plug 28 is provided with a tapered inner end. As shown, the tapered section has an outwardly flared shoulder at the plug bore; and this seats the tapered inner end 30 of the plug. This annular outer face of the plug may be provided with a cutout 28' for a screwdriver or the like to manipulate it to captivate the Teflon insert.

Within the passageway thus defined, a molded Teflon member which is integral is inserted; and its end 36 is captivated in place as shown by the plug in the preferred embodiment. Teflon is the trademark of a well known commercially available product of the E. I. duPont de Nemenours Company of Wilmington, Del. This Teflon insert has a tapered end zone indicated by the numeral 38 to line along the tapered section 24 and an outwardly flared terminal end zone 36 to dwell on the shoulder to be held by the end face 30 of the plug 28. The member has an axially extending zone 32 terminating at a tip 34, which is exterior of the die as shown; and the tip 34 is outwardly flared somewhat to smoothly or gradually break away from or depart from a plastic length on a mandrel being pulled axially from the right side of FIG. 2 to and out the left side of FIG. 2.

What is claimed is:

1. A finishing die for tubular material of plastic comprising:

a body of high heat conductive material having a first axial face and a second axial face and an axial through passageway between the faces composed of:

a first bore of a first predetermined diameter extending from said first axial face toward the second face to an inner end of said first bore in the body, and, a second bore extending from said second face toward, but not to, said first bore to an inner end spaced from the inner end of the first bore, said second bore being coaxial with and of a larger diameter than said first bore and being threaded, and an intermediate tapered zone coaxial with and extending between said bore ends and having a first and second section, said first section extending from the inner end of said first bore to an axial location adjacent the inner end of said second bore and spaced axially therefrom and being of a wider diameter than said first predetermined diameter of said first bore, and said second section extending from the first section in diverging relation with respect to first section to the inner end of second bore defining a shoulder facing toward said second face and being between the first section and said second bore, the plane of juncture of said first and second sections defining a mouth of a second predetermined diameter, a threaded part within second bore, said second bore having a inner end and outer end, said inner end being normally spaced from said shoulder when said plug is enthreaded in engagement in said second bore, said plug having a through recess of a diameter greater than said first predetermind diameter of said first bore and said through recess being in open communication with said mouth, and a tubular insert of uniform wall thickness in said passageway, said insert having, a first zone lining said shoulder, a second zone lining said first section, and a third zone lining said first bore and extending from said body away from said first face, and heater means for heaing said body.

2. The device as set forth in claim 1 wherein a recess is provided in the outer end of said plug for threaded movement of said plug relative to said second bore.

3. The device as set forth in claim 1 wherein said heater means comprises electrical resistance means for heating die.

4. The device as set forth in claim 1 wherein the body is of brass material.

5. The device as set forth in claim 1 wherein the third zone exending from said body away from said first face terminates at a tip zone and said tip zone is outwardly flared.

* * * * *